US006785685B2

(12) United States Patent
Soetarman et al.

(10) Patent No.: US 6,785,685 B2
(45) Date of Patent: Aug. 31, 2004

(54) APPROACH FOR TRANSFORMING XML DOCUMENT TO AND FROM DATA OBJECTS IN AN OBJECT ORIENTED FRAMEWORK FOR CONTENT MANAGEMENT APPLICATIONS

(75) Inventors: Basuki Soetarman, Los Gatos, CA (US); Robert Summers, San Jose, CA (US); Subodh Monica, Gaithersburg, MD (US); Larry An, Great Falls, VA (US); James Lin, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 09/935,251

(22) Filed: Aug. 22, 2001

(65) Prior Publication Data

US 2003/0126556 A1 Jul. 3, 2003

(51) Int. Cl.[7] ................................................ G06F 17/30
(52) U.S. Cl. ................................ 707/101; 707/2; 707/6; 707/10; 707/103
(58) Field of Search ..................................... 707/103, 100, 707/4, 101, 10, 2, 6; 705/23, 26; 709/201, 213, 217, 249, 202; 715/513, 501

(56) References Cited

U.S. PATENT DOCUMENTS

| | | | |
|---|---|---|---|
| 5,924,100 A | | 7/1999 | Chang et al. |
| 6,061,689 A | | 5/2000 | Chang et al. |
| 6,083,276 A | | 7/2000 | Davidson et al. |
| 6,154,738 A | * | 11/2000 | Call ............................. 707/4 |
| 6,170,081 B1 | | 1/2001 | Fontana et al. |
| 6,226,675 B1 | | 5/2001 | Meltzer et al. |
| 6,233,586 B1 | | 5/2001 | Chang et al. |
| 6,418,441 B1 | * | 7/2002 | Call ............................. 707/10 |
| 6,480,865 B1 | * | 11/2002 | Lee et al. ................... 715/523 |
| 6,560,633 B1 | * | 5/2003 | Roberts et al. ............... 707/20 |
| 6,585,778 B1 | * | 7/2003 | Hind et al. ................. 715/513 |

FOREIGN PATENT DOCUMENTS

| | | |
|---|---|---|
| JP | 11306205 | 5/1999 |
| WO | 0056033 | 3/2000 |
| WO | 0073941 | 5/2000 |
| WO | 0101300 | 6/2000 |

OTHER PUBLICATIONS

Suzuki et al., "Toward the interoperable software design models: Quartet of UML, XML, DOM and CORBA", pp. 1–8.*

Terry A. Scott, "An Xml Assignment for a programming languages course", ACM, pp. 163–171.*

Li et al., "Compiler support for efficient processing of XML datasets", ACM, pp. 42–52.*

(List continued on next page.)

Primary Examiner—Jean M. Corrielus
(74) Attorney, Agent, or Firm—Sawyer Law Group LLP (57) ABSTRACT

A method and system for transforming XML documents to and from data objects in an object oriented framework includes: importing the XML document; parsing the XML document; building a DOM tree from the parsed XML document; constructing at least one DDO or at least one XDO based on the DOM tree; and storing the DDO or XDO in a datastore. The present invention provides a transformation bridge connecting the XML world and the object world, allowing conversions from XML documents to data objects and vice versa to be performed seamlessly. It enhances the existing framework with a feature to process XML documents utilizing the existing framework facilities. Application developers can thus exploit the key advantages of XML representation as well as object orientation.

57 Claims, 4 Drawing Sheets

OTHER PUBLICATIONS

Salmimen et al., "Requirements for XML document database systems", ACM, pp. 85–94.*

Pietriga et al., "VXT: A Visual approach to XML transformations", ACM, pp. 1–10.*

Patel, Bhavini C. et al., "Querying Web Data: An Object-Oriented Approach," Dept. of Computer Science, Georgia State University, Atlanta, Georgia, pp. 253–261.

Gaedke, Martin et al., "Web Content Delivery to Heterogeneous Mobile Platforms," ER '98 Workshops on Data Warehousing and Data Mining, Mobile Data Access, and Collaborative Work Support and Spatio–Temporal Data Management, Singapore, Nov. 19–20, 1998 Proceedings, Springer, pp. 204–217.

Shimura, Takeyuki et al., "Storage and Retrieval of XML Documents Using Object–Relational Databases," 10th International Conference, DEXA'99 Florence Italy, Aug. 30–Sep. 3, 1999 Proceedings, Springer, pp. 206–217.

"Persistent Object Service Specification," Common Object Services Specification, vol. 1, Chap. 6, Mar. 1, 1994 & Oct. 12, 1994, pp. i–ii, 113–160.

IEEE 9th International Workshops on Enabling Technologies: Infrastructure for Collaborative Enterprises, National Institute of Standards and Technology, Gaithersburg, MD, Jun. 14–16, 2000, IEEE Computer Society, pp. 255–259.

Bernstein, Philip A. et al., "A Vision for Management of Complex Models," SIGMOD Record, Dec. 2000, vol. 29, No. 4, pp. 55–63.

Chen, Li et al., "SERFing the web: The Re–Web approach for web re–structuring," World Wide Web 3, 2000, pp. 95–109.

Yeh, Ching–Long, "A Logic Programming Approach to Supporting the Entries of SML Documents in an Object," Practical Aspects of Declarative Languages, Second International Workshop, PADL 2000, Boston, MA, Jan. 17–18, 2000, Proceedings, pp. 278–292.

e.V. von, Herausgegeben et al., "Sprache und Datenverarbeitung," International Journal for Language Data Processing, vol. 23, Feb. 1999, pp. 36–61.

* cited by examiner

APPROACH FOR TRANSFORMING XML DOCUMENT TO AND FROM DATA OBJECTS IN AN OBJECT ORIENTED FRAMEWORK FOR CONTENT MANAGEMENT APPLICATIONS

FIELD OF THE INVENTION

The present invention relates to database management systems, and more particularly, to the transforming of documents to and from data objects in the database management systems.

BACKGROUND OF THE INVENTION

The use of database management systems to manage information is well known in the art. For complex data management, object-oriented approaches are generally used. The term "object-oriented" refers to a software design method which uses "classes" and "objects" to model abstract or real objects. An "object" is the main building block of object-oriented programming, and is a programming unit which has both data and functionality (i.e., "methods"). A "class" defines the implementation of a particular kind of object, the variables and methods it uses, and the parent class it belongs to. Some known programming tools that can be used for developing search and result-management frameworks include C++ and Java.

Figure 1:
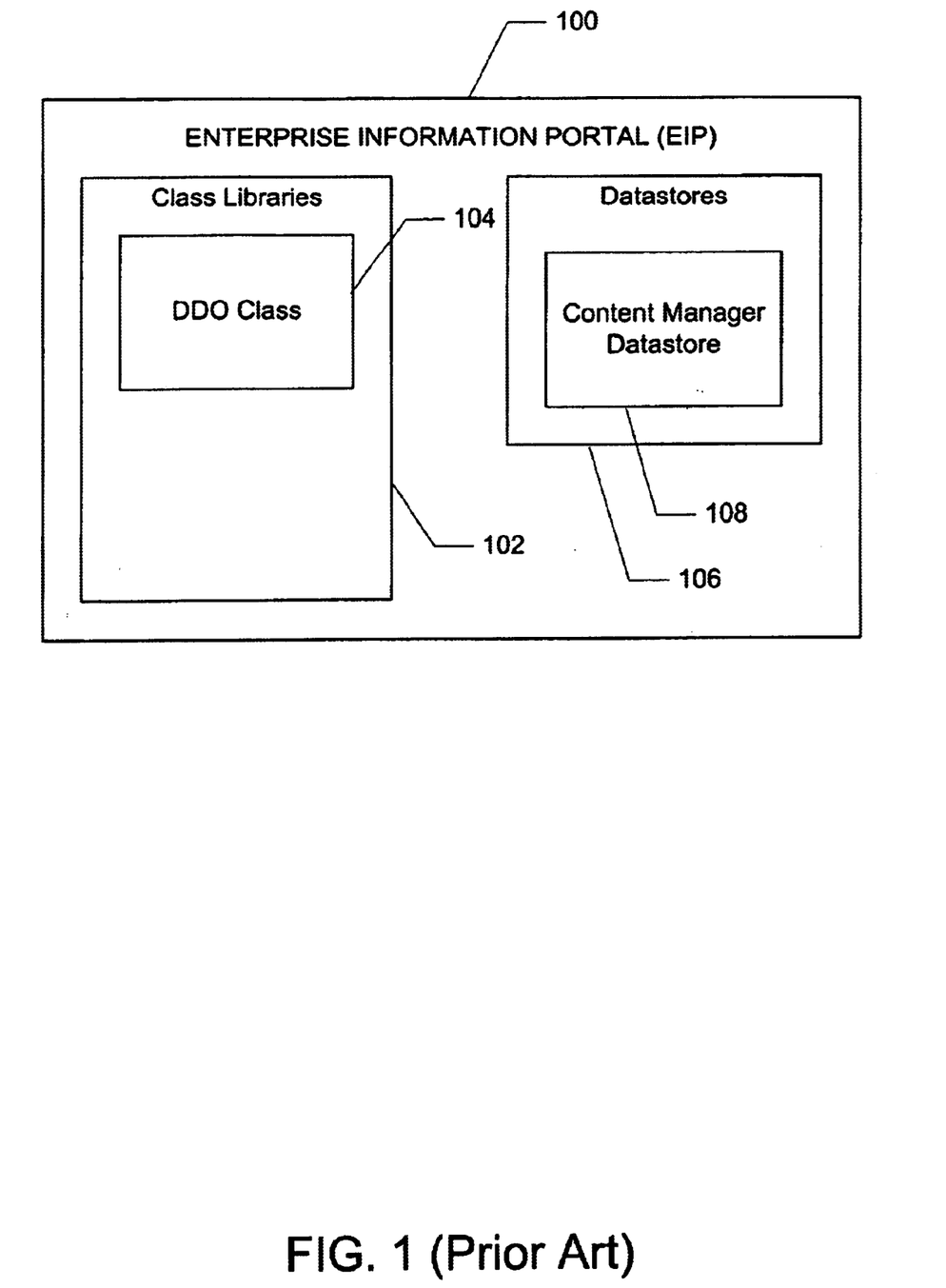
FIG. 1 illustrates a content management object oriented framework, the Enterprise Information Portal (EIP).

FIG. 1 illustrates a content management object oriented framework, the Enterprise Information Portal (EIP). The EIP 100 comprises a plurality of class libraries 102, including a dynamic data object (DDO) class 104. The DDO is a database-neutral representation of an object's persistent data. Its purpose is to contain the data for a single object. The DDO comprises a set of attributes and is a self-describing data object. Some of the DDO attributes could be of the extended data object (XDO) type. The XDO is used to hold content which is usually a large object (LOB). The DDO class has methods to support persistent operation on its data content, i.e., add, delete, update, and retrieve the data. These methods are used to bring data objects in and out of the persistent store. In these operations, the content or LOB will also be made persistent as well. The DDO specification is further described in the industry standard as established by the Object Management Group (OMG).

The EIP 100 also comprises datastores 107. A datastore is a term used to refer to a generic data storage facility, such as a relational data base, flat-file, hierarchical data base, etc. For example, for the CONTENT MANAGER, developed by INTERNATIONAL BUSINESS MACHINES CORPORATION, the EIP datastores 106 comprises a content manager datastore 108. The content manager datastore 108 would store the different types of data managed by the Content Manager.

However, the EIP 100 is not able to import documents with the extensible markup language (XML) format into its framework as data objects. The use of the XML document format has received widespread adoption by the industry. This approach provides numerous advantages, such as interchanging electronic documents between document repositories, automating business-to-business and business-to-consumer transactions, and allowing application programs to communicate regardless of programming languages and computing platforms where the applications run. Because the EIP 100 cannot import XML documents as data objects, it cannot exploit these advantages.

Accordingly, there exists a need for a method and system for transforming XML documents to and from data objects in an object oriented framework. The present invention addresses such a need.

SUMMARY OF THE INVENTION

A method and system for transforming XML documents to and from data objects in an object oriented framework includes: importing the XML document; parsing the XML document; building a DOM tree from the parsed XML document; constructing at least one DDO or at least one XDO based on the DOM tree; and storing the DDO or XDO in a datastore. The present invention provides a transformation bridge connecting the XML world and the object world, allowing conversions from XML documents to data objects and vice versa to be performed seamlessly. It enhances the existing framework with a feature to process XML documents utilizing the existing framework facilities. Application developers can thus exploit the key advantages of XML representation as well as object orientation.

DETAILED DESCRIPTION

The present invention provides a method and system for transforming XML documents to and from data objects in an object oriented framework. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 4 in conjunction with the discussion below.

Figure 2:
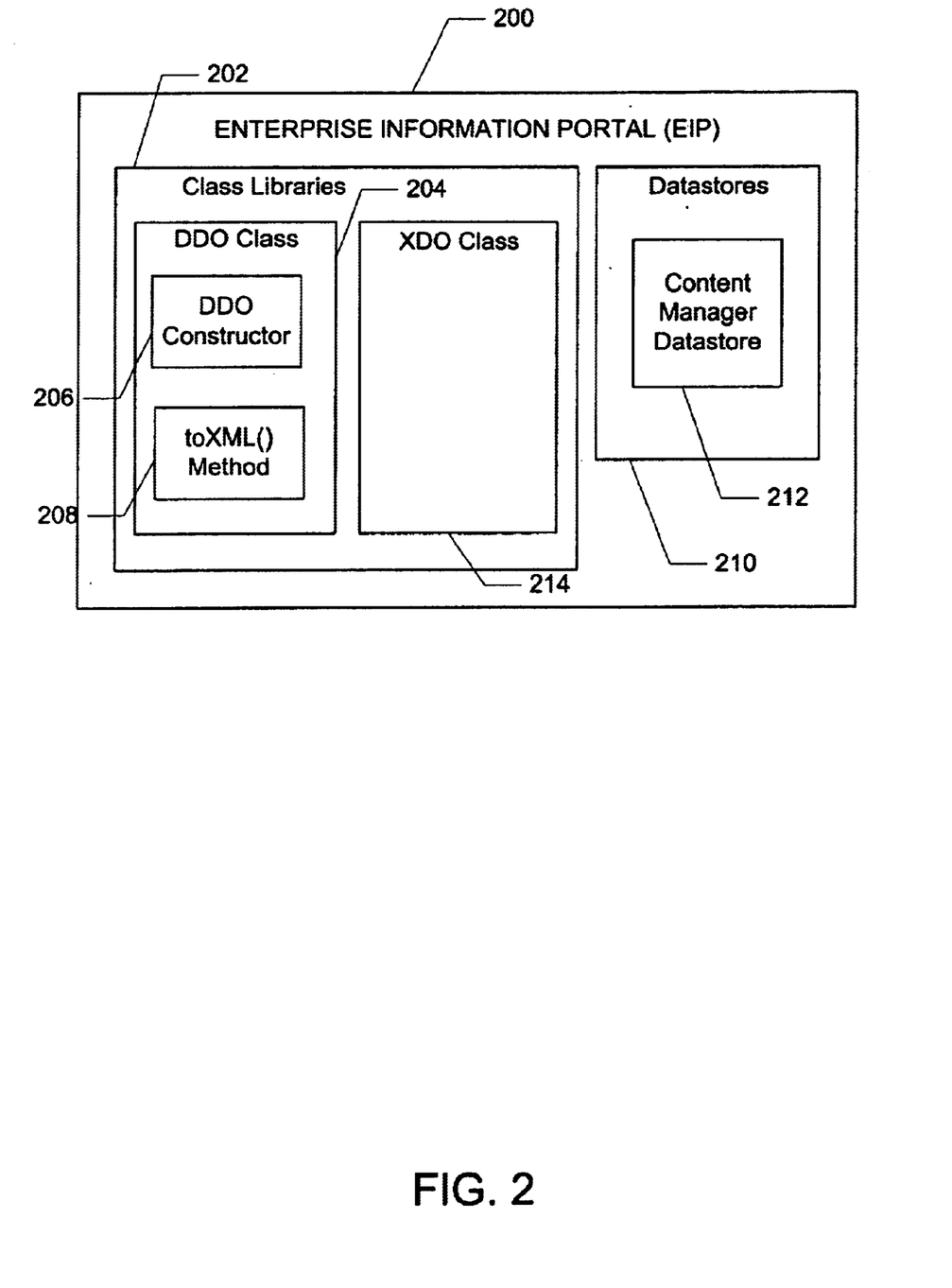
FIG. 2 illustrates a preferred embodiment of an object oriented framework in accordance with the present invention.

FIG. 2 illustrates a preferred embodiment of an object oriented framework in accordance with the present invention. The Enterprise Information Portal (EIP) framework 200 comprises a plurality of class libraries 202. The class libraries 202 comprise a dynamic data object (DDO) class 202 for creating DDO's and an extended dynamic object (XDO) class 214 for creating XDO's. The DDO class 204 includes a DDO constructor 206 for importing XML documents into the framework 200 and transforming them into data objects, such as a DDO or an XDO. The DDO or XDO would be stored in one of the datastores 210, such as the content manager datastore 212. The DDO class 204 also includes a toXML( ) method 208 for exporting a DDO or XDO as an XML document. The importing and exporting of XML documents is based on the persistence properties of DDO's and XDO's, as described in the standard established by the Object Management Group (OMG). Applicant incorporates this standard in its entirety by reference.

Figure 3:
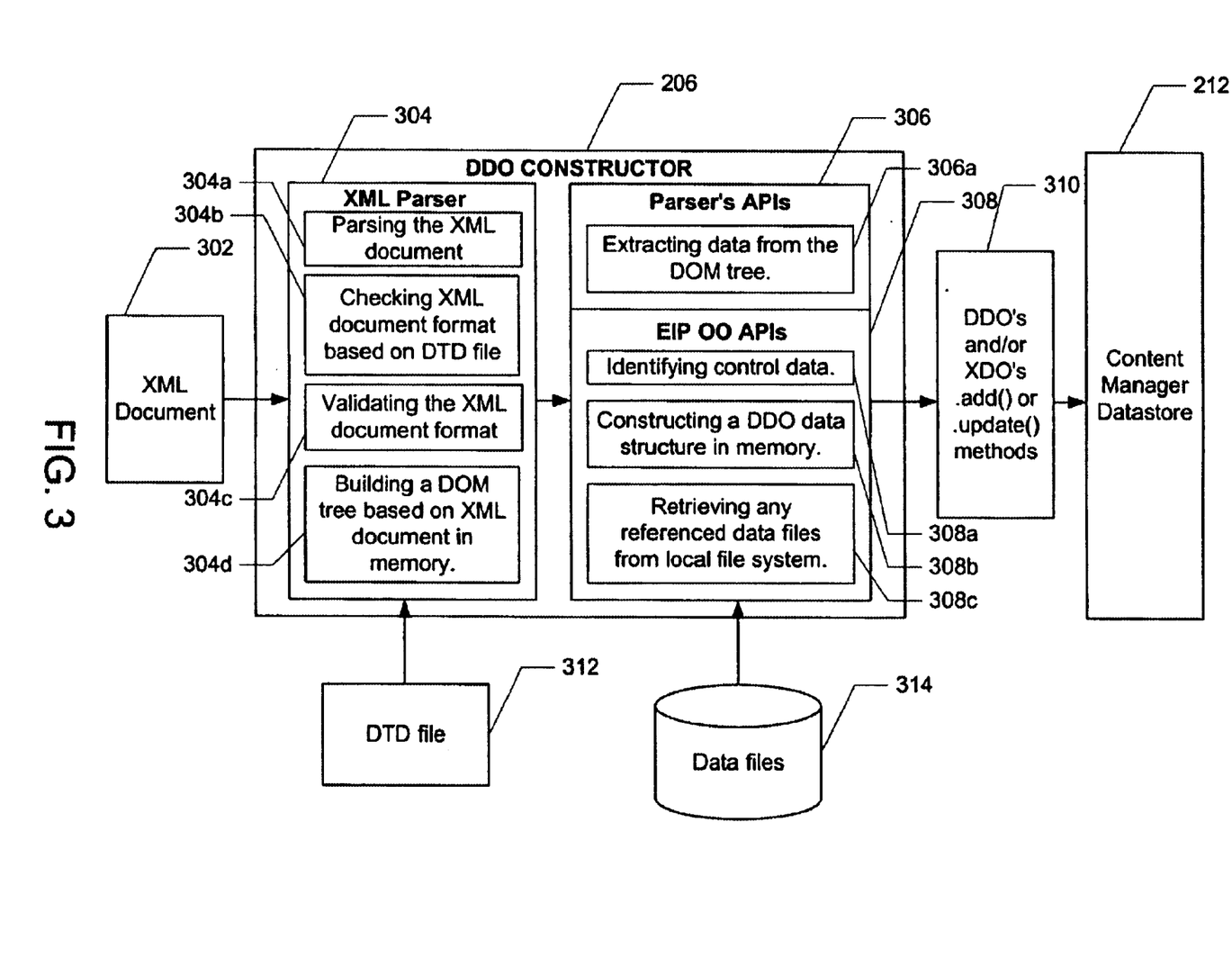
FIG. 3 is a process flow chart illustrating a preferred embodiment of importing an XML document into the object oriented framework as a data object in accordance with the present invention.

FIG. 3 is a process flow chart illustrating a preferred embodiment of importing an XML document into the object oriented framework as a data object in accordance with the present invention. First, an XML document 302 is input into the DDO constructor 206 as an input parameter. The XML parser 304 of the DDO constructor 206 parses the XML document 302, via step 304a, and checks the format of the XML document 302 according to a Document Type Definition (DTD) file 312, via step 304b. The DTD file 312 defines the valid format of an XML document to be transformed by the DDO constructor 206. The XML parser 304 then validates the XML document format, via step 304c. If the XML document 302 does not conform to the format defined by the DTD file 312, then an error is indicated. If the XML document 302 does conform to the format defined by the DTD file 312, then a Document Object Model (DOM) tree is built based on the XML document 302, via step 304d. A DOM tree is a representation of the hierarchy information in the XML document 302. In the preferred embodiment, steps 304a–304d are performed in memory.

Next, the parser's API's 306 extract data from the DOM tree, via step 306a, i.e., the Application programming Interfaces (API) 306 call methods in the DDO class 204 against the DOM tree to obtain desired information. The data includes the values for the DDO's or XDO's to be created. The values of the DDO, XDO or collection of DDO's and XDO's, can be either embedded in the XML document 302 or the values for the XDO or collection of XDO's can be in data files 314 which are referenced in the XML document 302. If the values are embedded, then they are parsed and imported. If the values are in data files 314, then the API's 308 retrieve the data files 314 referenced in the XML document 302 from the local file system, via step 308c. Approximately simultaneously, the EIP's object oriented (OO) API's 308 identifies control data from the DTD file 312, via step 308a. The control data in the DTD file 312 describes the format of the DDO's and XDO's which can be created by the DDO constructor 206. The DTD file 312 describes the XDO's in sufficient detail for the DDO constructor 206 to create the XDO's. The DDO constructor 206 then and constructs a DDO data structure in memory based on the extracted data and the control data, via step 308b. Objects are then created using the methods in the DDO class, and the DDO data structure is populated with these objects by calling the .add( ) method, via step 310. These objects may be modified by calling the .update( ) method. These objects can be a DDO, an XDO, a collection of DDO's, and/or a collection of XDO's. The populated DDO is then placed in persistent store in the content manager datastore 212.

In the preferred embodiment, the import function is implemented with the following Java code:

```
/**
 * Creates a new DKDDO object using the given XML input file.
 * All references to binary data (blob or xdo) will be resolved and brought into
 * memory.
 *
 * @param xmlSource    is a DLNVPair class specifying the XML source
 *                     characteristics, with the following possible values:
 * <ul>
 *    <li> ("BUFFER", <buffer_ref>)    : buffer_ref is a reference to a string in
 *                                       memory
 *    <li> ("FILE", <file_name>)       : string file_name is the name of the file
 *                                       containing the XML
 *    <li> ("URL", <url_address>)      : string URL-address location of the XML
 *    <li> ("STDIN", null)             : input XML is taken from standard input
 *                                       (STDIN)
 * </eul>
 * @param options options to govern the construction of xdo classes, if exists in the
 *    XML input
 * Valid values are specified by constants in DKConstant.java:
 *    public static int DK_CM_XDO_EMBED = 0;
 *       retrieve any reference to blobs into memory
 *    public static int DK_CM_XDO_REFERENCE =1;
 *       do not retrieve any reference to xdo, i.e. in form of file reference or URL,
 *       into memory, but delay it until the value is needed. If the value is needed
 *       for an add operation, i.e. to make it persistent, then it will try to optimize
 *       the operation via xdo.add(fromFile) whenever possible.
 */
public DKDDO(DKNVPair xmlSource, int options);
public DKDDO(DKNVPair xmlSource);
```

In the preferred embodiment, the DTD file 312 is as follows:

```
<!ELEMENT ddo:ddo (ddo:pid, ddo:propertyCount?, ddo:property*,
                   ddo:dataCount?, ddo:dataItem*)>
    <!ATTLIST ddo:pid ddo:dsType         CDATA #IMPLIED
                      ddo:dsName         CDATA #IMPLIED
                      ddo:pidString      CDATA #IMPLIED>
<!ELEMENT ddo:propertyCount (#PCDATA)?>
<!ELEMENT ddo:property EMPTY>
    <!ATTLIST ddo:property ddo:propertyID    CDATA #IMPLIED
                           ddo:propertyName  CDATA #IMPLIED\
```

-continued

```
                         ddo:propertyValue    CDATA #IMPLIED?
<!ELEMENT ddo:dataCount (#PCDATA)>
<!ELEMENT ddo:dataItem (ddo:dataPropertyCount?,
                        ddo:dataProperty+,
                        (ddo:dataValue |
                         ddo:dataValues)
                       )>
    <!ATTLIST ddo:dataItem ddo:dataID         CDATA #IMPLIED
                           ddo:dataName       CDATA #IMPLIED>
<!ELEMENT ddo:dataValues (ddo:dataValueCount?, ddo:dataValue+)>
<!ELEMENT ddo:dataValueCount (#PCDATA)>
<!ELEMENT ddo:dataValue (#PCDATA | ddo:xdoRef | ddo:ddo)>
<!ELEMENT ddo:xdoRef (ddo:xdoPid, ddo:xdoValue)>
<!ELEMENT ddo:xdoPid EMPTY>
    <!ATTLIST ddo:xdoPid    ddo:dsType CDATA #REQUIRED
                            ddo:dsName       CDATA #REQUIRED
                            ddo:xdoType      CDATA #REQUIRED
                            ddo:partId       CDATA #REQUIRED
                            ddo:repType      CDATA #REQUIRED
                            ddo:pidString    CDATA #REQUIRED
<!ELEMENT ddo:xdoValue (ddo:contentType?, ddo:searchEngineInfo?,
                        ddo:smsInfo?, ddo:xdoContent?)>
    <!ATTLIST ddo:xdoValue
             ddo:refType          CDATA #REQUIRED
             ddo:refEncoding      CDATA #IMPLIED
             ddo:mimeType         CDATA #REQUIRED
             XML-LINK             CDATA #IMPLIED
             HREF                 CDATA #IMPLIED
<!ELEMENT ddo:contentType (#PCDATA)>
<!ELEMENT ddo:searchEngineInfo    EMPTY>
    <!ATTLIST ddo:searchEngineInfo    ddo:searchEngine CDATA #REQUIRED
                                      ddo:searchIndex  CDATA #REQUIRED
                                      ddo:searchInfo   CDATA #REQUIRED>
<!ELEMENT ddo:smsInfo EMPTY>
    <!ATTLIST ddo:smsInfo    ddo:smsRetention    CDATA #IMPLIED
                             ddo:smsCollection   CDATA #IMPLIED
                             ddo:smsMgmtClass    CDATA #IMPLIED
                             ddo:smsStorageClass CDATA #IMPLIED
                             ddo:smsObjServer    CDATA #IMPLIED
<!ELEMENT ddo:xdoContent (#PCDATA)>
```

Figure 4:
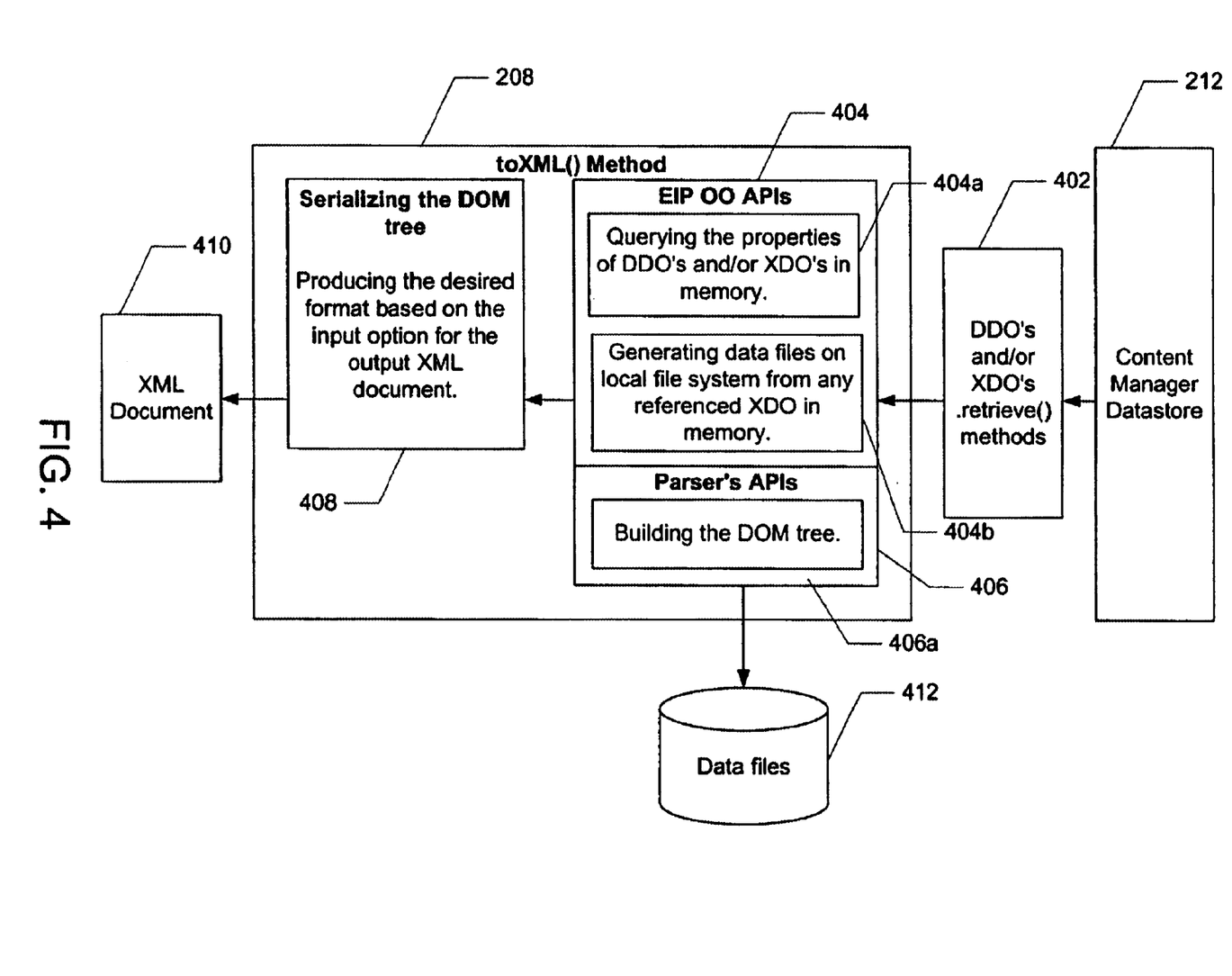
FIG. 4 is a process flow chart illustrating a preferred embodiment of exporting an XML documents from a data object in the object oriented framework in accordance with the present invention.

FIG. 4 is a process flow chart illustrating a preferred embodiment of exporting an XML documents from a data object in the object oriented framework in accordance with the present invention. First, the DDO's or XDO's are retrieved from the content manager datastore 212, via step 402, using the .retrieve( ) methods of the DDO class 204. The DDO or XDO is retrieved from persistent store into memory. The toXML( ) method 208 is then called. The EIP OO APIs 404 query the properties of the DDO's or XDO's in memory, via step 404a, and generate data files 412 on the local file system from any referenced XDO objects that are in memory, via step 404b. The properties of the DDO's or XDO's include the attributes of the object and the properties of the object itself. Approximately simultaneously, the parser's APIs 406 build a DOM tree based on the properties of the DOD's or XDO's, via step 406a. In the preferred embodiment, the DOM tree is built on the fly and in memory. The toXML( ) method 208 then serializes the DOM tree, via step 408, by producing the desired format based on the options for the output XML document 410. Options include whether to embed the XDO values in the XML document 410 or have a reference in the XML document 410 to data files 412 which contain the values. The XML document 410 results.

In the preferred embodiment, the export function is implemented with the following Java code:

```
/**
 * Generates the corresponding XML from this DKDDO. If the DDO is a nested
 * object, it assumes that the DDO has been instantiated/retrieved up to the desired
 * level of depth.
 * @param xmlDestination specifies where the XML output should go, valid values
 *     are:
 * <ul>
 *     <li> ("BUFFER", <buffer_ref>) : buffer_ref is a reference to a string in memory
 *     <li> ("FILE", <file_name>)    : string file_name is the name of the file to
 *                                     contain the XML
 *     <li> ("URL", <url_address>)   : string URL-address location for the XML
 *     <li> ("STDOUT", null)         : output XML is directed to the standard
 *                                     output (STDOUT)
 * </eul>
 * @param options same as options described in the constructor above.
 *     DK_CM_XDO_EMBED means to embed the xdo value in the generated XML,
```

```
*              either in plain text form (#PCDATA) or in Base64 encoding.
*       DK_CM_XDO_REFERENCE means that you want to represent any blob with a
*              reference to a file or URL, in which the file or URL will be created by
*              writing the xdo content out to it.
*              Both options above are mutually exclusive.
* The following option is complementary to the above:
*       DK_CM_XDO_RETRIEVE means that in addition of either one of the two
*              options above, if the xdo content is not retrieved then it will be retrieved. If
*              the destination is file, URL, or STDOUT, the implementation may want to
*              optimize the content transfer directly to the destination, without storing
*              intermediate copy in main memory.
* Note: If destination is memory BUFFER or STDOUT and the path is not null and
*       the options is REFERENCE, then a reference form to the xdo will be created as
*       described above.
public void toXML (DKNVPair xmlDestination, String path, long options);
```

For example, assume that a simple DDO contains two attributes: (1) name="Title", value="How to marry a millionaire"; (2) name="Author", value="Dr. Ruth Wildheimer". Assume also that this DDO has been stored in persistent store in the content manager datastore 212. This DDO can be retrieved and the toXML( ) method 208 called, resulting in an XML document 410 approximately like the following:

the process which will import the XML has access to the same file systems. Either directory path and file name or a URL notation can be used to specify the reference, for example:
file://c:/picture.gif.

Per referencing a URL, the blob content is written into a web server directory, and a reference is established to the directory. This approach assumes that a web server exists,

```
<?xml version="1.0" encoding="UTF-8"?>
<!DOCTYPE ddo:ddo SYSTEM "ddo.dtd">
<ddo:ddo ddo:entityName="DLSAMPLE"
      xmlns=http://www.omg.org/pub/docs/formal/97-12-12.p-df#ddo/EIP-7.1>
   <pid dsType="DL" dsName="LIBARNEY"
      pidString="44 2 DL8 LIBARNEY8 DLSAMPLE19 16 FKX$S0A9PPGZSS41"/>
   <propertyCount>1</propertyCount>
   <property propertyId="1" propertyName="item-type"
             propertyValue="document" />
   <!--or folder, etc.-->
   <dataCount>2</dataCount>
   <dataItem dataId="1" dataName="Title">
      <dataProperty propertyId="1" propertyName="type"
             propertyValue="string"/>
      <dataProperty propertyID="2" propertyName="nullable"
             propertyValue="true"/>
      <dataValue>How to marry a millionaire</dataValue>
   </dataItem>
   <dataItem dataId="2" dataName="Author">
      <dataProperty propertyId="1" propertyName="type"
             propertyValue="string"/>
      <dataProperty propertyId="2" propertyName="nullable"
             propertyValue="false"/>
      <dataValue>Dr. Ruth Wildheimer</dataValue>
   </dataItem>
</ddo:ddo>
```

In the preferred embodiment, there are four different ways to import and export an XDO or blobs from and into the resulting XML document: (1) embedding, (2) reference to a file, (3) reference to a URL, or (4) using PidString. These four approaches are first discussed for the exporting of an XDO or blob.

Per embedding the blob content in the XML document 410, if the blob contains binary-data, it is converted to Base64 encoding before embedding it in the XML document 410. If the data is of type plain text, then encoding is not necessary. In this case, the encoding is set to plain-text. The advantage of this approach is that since the blob content is packaged together with the XML, the document will be self contained.

Per referencing a file, the blob content is written out into a local file or network file system 412. A reference is established to the file system. This approach assumes that and the process which will import the XML has access to the web server to retrieve the content.

Per using PidString, PidString is a persistent identifier defined in the OMG standard. It is mechanism used to find particular items in a datastore. Once a PidString is created for an item, it can be stored within the DDO or the XDO and reused. The PidString created for the blob content can be used to retrieve the blob content.

The four approaches are next discussed for the importing of XDOs or blobs.

Per embedding the blob content in the XML document 302, if the content is embedded using Base64 encoding, it will be decoded by a Base 64 decoder. If the content is plain-text, it will be read in directly.

Per referencing a file, there are two possibilities. First, the blob content is read in immediately to main memory. Second, if the blob content is stored in a file, then the XDO should make a note of it. When the add operation is called, the blob content will be transferred directly to the persistent store. In this approach, the XDO class is modified to handle this delayed content read.

Per referencing a URL, during the add operation, the blob content will be retrieved from the web server and transferred directly to the persistent store.

Per using PidString, the URL string will be parsed to extract the PidString and the object type. Based on this information, the proper blob object and its Pid can be created.

The same approaches may be used when importing or exporting collections of DDO's or XDO's.

The XML segments imported into the framework 200 or exported from the framework 200 can comprise representations for single-valued data-items, representations for multi-valued data-items, a reference to a single XDO whose value is embedded into the XML document, a reference to a single XDO whose value is in a file, a reference to a single DDO, a reference to a collection of XDO's, a reference to a collection of DDO's, and/or a self reference to the source XML document to be stored as an XDO. Examples of each of these are as follows:

The following is an example of an XML segment with representations for single-valued data-items:

```
<dataItem dataId=1" dataName="Author"/>
<dataPropertyCount>2</dataPropertyCount>
<dataProperty propertyId="1" propertyName="type" propertyValue=
"string"/>
<dataProperty propertyId="2" propertyName="nullable"
                                    propertyValue="false"/>
<dataValue>Dr. Ruth Wildheimer</dataValue>
</dataItem>
```

The following is an example of an XML segment with representations for multi-valued data-items:

```
    <dataItem dataId="1" dataName="Authors"/>
        <dataPropertyCount>2</dataPropertyCount>
        <dataProperty propertyId="1" propertyName="type"
            propertyValue="collection+string"/>
        <dataValues>
            <dataValueCount>2</dataValueCount>
            <dataValue>Dr. Ruth Wildheimer</dataValue>
            <dataValue>Ivonna Trump</dataValue>
        </dataValues>
    </dataItem>
```

The following are examples of XML segments with a reference to a single XDO. The value of the XDO can either be embedded inside the XML document or can be in a file. The following is an example of a XML segment with a reference to a single XDO when the value of the XDO is embedded inside the XML segment:

```
<dataItem dataId="1" dataName="Employee_Photo"/>
    <dataPropertyCount>2</dataPropertyCount>
    <dataPropertyId="1" propertyName="type" propertyValue="xdo"/>
    <dataProperty propertyId="2"    propertyName-"nullable"
                                    propertyValue="true"/>
    <dataValue>
        <xdoRef>
            <xdoPid dsType="DL" xdoType="DKBlobDL"/>
            <xdoValue   refType="embed"
                        refEncoding="Base64"
                        mimeType="image/bmp">
```

-continued

```
                <contentType>WINV3BM</contentType>
                <searchEngineInfo searchEngine="SM" searchIndex=
                "TMINDEX"
                        searchInfo="ENU"/>
                <smsInfo collection="CBR.CLLCT001"/>
                <!--following is XDO binary content, embedded in
                Base64 encoding -->
                    <xdoContent>
                    aBcYp12....a.very.long..content..encoded.in.
                    Base64....etc
                    </xdoContent>
            </xdoValue>
        </xdoRef>
    </dataValue>
<dataItem>
```

The following is an example of a XML segment with a reference to a single XDO when the value of the XDO is in a file:

```
<dataItem dataId="2" dataName="Employee_Resume"/>
    <dataPropertyCount>2</dataPropertyCount>
    <dataPropertyId="1" propertyName="type" propertyValue="xdo"/>
    <dataProperty propertyId="2"    propertyName-"nullable"
                                    propertyValue="true"/>
    <dataValue>
        <xdoRef>
            <xdoPid dsType="DL" xdoType="DKBlobDL"/>
            <xdoValue refType="file"
                    mimeType="text/plain"
                    XML-LINK="SIMPLE"
                    HREF="C:\userarea\tmp\resume.txt">
                <contentType>ASCII</contentType>
                <searchEngineInfo searchEngine="SM" searchIndex=
                "TMINDEX"
                        searchInfo="ENU"/>
                <smsInfo collection="CBR.CLLCT001"/>
            </xdoValue>
        </xdoRef>
    </dataValue>
<dataItem>
```

The following is an example of a XML segment with a reference to a single DDO:

```
<dataItem dataId="1" dataName="InvoiceRecord"/>
    <dataProperty propertyId="1" propertyName-"type" propertyValue-
    "ddo"/>
    <dataProperty propertyId="2" propertyName="nullable"
                                    propertyValue="false"/>
    <dataValue>
        <ddo entityName="Invoice">
            <pid .../>
            <propertyCount> ...
            <property ...>
            <dataItem ...>
                <!-- ...etc....this structure can be nested -->
        </ddo>
    </dataValue>
</dataItem>
```

The following is an example of a XML segment with a reference to a collection of XDO's:

```
<dataItem dataId="3" dataName="DKParts"/>
    <dataPropertyCount>2</dataPropertyCount>
    <dataProperty propertyID="1" propertyName="type"
```

-continued

```
        propertyValue="collection+xdo"/>
<dataProperty propertyId="2" propertyName="nullable"
        propertyValue="true"/>
<dataValues>
    <dataValueCount>2</dataValueCount>
    <dataValue>
        <xdoPid dsType="DL" xdoType="DKBlobDL" partId="1"
                repType="FRN$NULL"/>
        <xdoValue   refType="embed"
                    refEncoding="Base64"
                    mimeType="image/bmp">
        <contentType>WINV3BM</contentType>
        <searchEngineInfo searchEngine="SM" searchIndex=
        "TMINDEX"
                searchInfo="ENU"/>
        <smsInfo collection="CBR>CLLCT001"/>
        <!--following is XDO binary content,
        embedded in Base 64 encoding
        -->
            <xdoContent>
            aBcYp12....a.very.long..content..encoded.in.
            Base64....etc
            </xdoContent>
        </xdoValue>
    </xdoRef>
    </dataValue>
    <dataValue>
        <xdoRef>
            <xdoPid dsType="DL" xdoType=
            "DKBlobDL" partId="1"/>
            <xdoValue refType="file"
                mimeType="text/plain"
                XML-LINK="SIMPLE"
                HREF="c:\userarea\tmp\resume.text">
        <contentType>ASCII</contentType>
        <searchEngineInfo searchEngine="SM" searchIndex=
        "TMINDEX"
                searchInfo="ENU"/>
        <smsInfo collection="CBR>CLLCT001"/>
        </xdoValue>
    </xdoRef>
    </dataValue>
</dataValues>
</dataItem>
```

The following is an example of a XML segment with a reference to a collection of DDO's:

```
<dataItem dataId="5" dataName="DKFolder"/.
    <dataPropertyCount>2</dataPropertyCount?
    <dataProperty    propertyId="1" propertyName="type"
                     propertyValue="collection+ddo"/>
    <dataProperty    propertyId="2" propertyName="nullable"
                     propertyValue="false"/>
    <dataValues>
        <dataValueCount>2</dataValueCount>
        <dataValue>
            <ddo entityName="DLSAMPLE">
                <pid .../>
                <propertyCount> ...
                <property ...>
                <dataItem ...>
                    <!...etc....this structure can be nested -->
            </ddo>
            <ddo entityName="DLSAMPLE">
                <pid .../>
                <propertyCount> ...
                <property ...>
                <dataItem ...>
                    <!-- ...etc....this structure can be nested -->
            </ddo>
        </dataValue>
    </dataValues>
</dataItem>
```

The following is an example of a XML segment with a self reference to the source XML document to be stored as an XDO. This self reference is useful for including the original XML source in the DDO to be constructed during the import process, either as an individual part or as a part in a collection. The preferred embodiment captures the current XML source and sets it as the content of the newly created XDO object:

```
...
<xdoRef>
    <xdoPid dsType="DL" xdoType="DKBlobDL"/>
    <xdoValue    refType="self"
                 mimeType="text/xml">
        <contentType>XML</contentType>
        <searchEngineInfo searchEngine="sm" searchIndex=
        "TMINDEX"
                searchInfo="ENU"/>
        <smsInfo collection="CBR.CLLCT001"/>
    </xdoValue>
</xdoRef>
```

A method and system for transforming XML documents to and from data objects in an object oriented framework has been disclosed. The present invention provides a transformation bridge connecting the XML world and the object world, allowing conversions from XML documents to data objects and vice versa to be performed seamlessly. It enhances the existing framework with a feature to process XML documents utilizing the existing framework facilities. Application developers can thus exploit the key advantages of XML representation as well as object orientation.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for transforming an Extensible Markup Language (XML) document to data objects in an object oriented framework, comprising the steps of:
   importing the XML document;
   parsing the XML document;
   building a document object model (DOM) tree from the parsed XML document, wherein the DOM tree comprises hierarchy information in the XMl document;
   constructing at least one dynamic data object (DDO) or at least one extended dynamic data object (XDO) based on the DOM tree; and
   storing the DDO or XDO in a datastore.

2. The method of claim 1, wherein the parsing step (b) further comprises:
   (b1) checking the XML document format based on a document type definition (DTD) file; and
   (b2) validating a format of the checked XML document.

3. The method of claim 1, wherein the constructing step (d) comprises:
   (d1) extracting values for the DDO or XDO from the DOM tree;
   (d2) identifying control data in a DTD file;
   (d3) constructing a DDO data structure in memory;
   (d4) creating the DDO or the XDO from the extracted data and the control data; and
   (d5) populating the DDO data structure with the DDO or XDO.

4. The method of claim 3, wherein the control data comprises a format for the DDO or the XDO.

5. The method of claim 3, wherein the creating step (d4) comprises:
(d4i) retrieving values embedded in the XML document for the DDO or XDO; and
(d4ii) creating the DDO or XDO from the embedded data.

6. The method of claim 3, wherein the creating step (d4) comprises:
(d4i) retrieving a data file referenced in the XML document; and
(d4ii) creating the XDO from the data file.

7. The method of claim 1, wherein the storing step (e) stores the DDO or XDO in persistent store.

8. The method of claim 1, further comprising:
retrieving the DDO or XDO from the datastore;
building the DOM tree from the retrieved DDO or XDO; and
producing the XML document from the DOM tree.

9. The method of claim 8, wherein the building step (g) comprises:
(g1) querying a plurality of properties of the retrieved DDO or XDO; and
(g2) building the DOM tree based on the plurality of attributes.

10. The method of claim 9, wherein the querying step (g1) further comprises:
(g1i) generating a data file from a referenced XDO in the plurality of properties.

11. The method of claim 8, wherein the producing step (h) comprises:
(h1) producing the XML document from the DOM tree based on an input option for the XML document.

12. The method of claim 11, wherein the input option is to embed values for the XDO in the XML document.

13. The method of claim 11, wherein the input option is to reference a data file for the XDO in the XML document.

14. The method of claim 1, wherein the at least one DDO comprises a single DDO.

15. The method of claim 1, wherein the at least one DDO comprises a collection of DDO's.

16. The method of claim 1, wherein the at least one XDO comprises a single XDO.

17. The method of claim 1, wherein the at least one XDO comprises a collection of XDO's.

18. A method for transforming an Extensible Markup Language (XML) document from data objects in an object oriented framework, comprising the steps of:
retrieving at least one document object model (DDO) or at least one extended dynamic data object (XDO) from a datastore;
building a document object model (DOM) tree from the retrieved DDO or XDO, wherein the DOM tree comprises hierarchy information for the XML document; and
producing the XML document from the DOM tree.

19. The method of claim 18, wherein the building step (b) comprises:
(b1) querying a plurality of properties of the retrieved DDO or XDO; and
(b2) building the Dom tree based on the plurality of properties.

20. The method of claim 19, wherein the querying step (b1) further comprises:
(b1i) generating a data file from a referenced XDO in the plurality of properties.

21. The method of claim 18, further comprises:
(c1) producing the XML document from the DOM tree based on an input option for the XML document.

22. The method of claim 21, wherein the input option is to embed values for the XDO in the XML document.

23. The method of claim 21, wherein the input option is to reference a data file for the XDO in the XML document.

24. The method of claim 18, wherein the at least one DDO comprises a single DDO.

25. The method of claim 18, wherein the at least one DDO comprises a collection of DDO's.

26. The method of claim 18, wherein the at least one XDO comprises a single XDO.

27. The method of claim 18, wherein the at least one XDO comprises a collection of XDO's.

28. A computer readable medium with program instruction for transforming an Extensible Markup Language (XML) document to data objects in an object oriented framework, comprising instructions for:
importing the XML document;
parsing the XML document;
building a document object model (DOM) tree from the parsed XML document, wherein the DOM tree comprises hierarchy information in the XMl document;
constructing at least one dynamic data object (DDO) or at least one extended dynamic data object (XDO) based on the DOM tree; and
storing the DDO or XDO in a datastore.

29. The medium of claim 28, wherein the parsing instruction (b) further comprises:
(b1) checking the XML document format based on a DTD file; and
(b2) validating a format of the checked XML document.

30. The medium of claim 28, wherein the constructing instruction (d) comprises:
(d1) extracting values for the DDO or XDO from the DOM tree;
(d2) identifying control data in a DTD file;
(d3) constructing a DDO data structure in memory;
(d4) creating the DDO or the XDO from the extracted data and the control data; and
(d5) populating the DDO data structure with the DDO or XDO.

31. The medium of claim 30, wherein the control data comprises a format for the DDO or the XDO.

32. The medium of claim 30, wherein the creating instruction (d4) comprises:
(d4i) retrieving values embedded in the XML document for the DDO or XDO; and
(d4ii) creating the DDO or XDO from the embedded data.

33. The medium of claim 30, wherein the creating instruction (d4) comprises:
(d4i) retrieving a data file referenced in the XML document; and
(d4ii) creating the XDO from the data file.

34. The medium of claim 28, wherein the storing instruction (e) stores the DDO or XDO in persistent store.

35. The medium of claim 28, further comprising instructions for:
retrieving the DDO or XDO from the datastore;
building the DOM tree from the retrieved DDO or XDO; and
producing the XML document from the DOM tree.

36. The medium of claim 35, wherein the building instruction (g) comprises:

(g1) querying a plurality of properties of the retrieved DDO or XDO; and (g2) building the DOM tree based on the plurality of attributes.

37. The medium of claim 36, wherein the querying instruction (g1) further comprises:

(g1i) generating a data file from a referenced XDO in the plurality of properties.

38. The medium of claim 35, wherein the producing instruction (h) comprises:

(h1) producing the XML document from the DOM tree based on an input option for the XML document.

39. The medium of claim 38, wherein the input option is to embed values for the XDO in the XML document.

40. The medium of claim 38, wherein the input option is to reference a data file for the XDO in the XML document.

41. The medium of claim 28, wherein the at least one DDO comprises a single DDO.

42. The medium of claim 28, wherein the at least one DDO comprises a collection of DDO's.

43. The medium of claim 28, wherein the at least one XDO comprises a single XDO.

44. The medium of claim 28, wherein the at least one XDO comprises a collection of XDO's.

45. A computer readable medium with program instructions for transforming an Fxtensible Markup Language (XML) document from data objects in an object oriented framework, comprising the instructions for:

retrieving at least one dynamic data object (DDO) or at least one extended dynamic data object (XDO) from a datastore;

building a document object model (DOM) tree from the retrieved DDO or XDO, wherein the DOM tree comprises hierarchy information for the XML document; and producing the XML document from the DOM tree.

46. The medium of claim 45, wherein the building instruction (b) comprises:

(b1) querying a plurality of properties of the retrieved DDO or XDO; and (b2) building the Dom tree based on the plurality of properties.

47. The medium of claim 46, wherein the querying instruction (b1) further comprises:

(b1i) generating a data file from a referenced XDO in the plurality of properties.

48. The medium of claim 45, wherein the producing instruction comprises:

(c1) producing the XML document from the DOM tree based on an input option for the XML document.

49. The medium of claim 48, wherein the input option is to embed values for the XDO in the XML document.

50. The medium of claim 48, wherein the input option is to reference a data file for the XDO in the XML document.

51. The medium of claim 45, wherein the at least one DDO comprises a single DDO.

52. The medium of claim 45, wherein the at least one DDO comprises a collection of DDO's.

53. The medium of claim 45, wherein the at least one XDO comprises a single XDO.

54. The medium of claim 45, wherein the at least one XDO comprises a collection of XDO's.

55. A system, comprising:

a class library, the class library comprising:

a dynamic data object (DDO) class, the DDO class comprising:

a DDO constructor for transforming an Extensible Markup Language (XML) document to data objects in an object oriented framework, wherein the DDO constructor:

imports the XML document, parses the XML document, builds a document object model (DOM) tree from the parsed XML document, and constructs at least one dynamic data object (DDO) or at least one extended dynamic data object (XDO) based on the DOM tree; and at least one datastore, wherein the DDO or the XDO is stored in the datastore.

56. The system of claim 55, wherein the DDO class further comprises:

a DDO retrieve( ) method for retrieving the DDO or XDO from the datastore; and a toXML( ) method for transforming the DDO or XDO to the XML document, wherein the toXML( ) method:

builds the DOM tree from the retrieved DDO or XDO, and produces the XML document from the DOM tree.

57. A system, comprising:

at least one datastore, wherein a dynamic data object (DDO) or an extended dynamic data object (XDO) is stored in the datastore; and a class library, the class library comprising:

a DDO class, the DDO class comprising:

a DDO retrieve( ) method for retrieving the DDO or the XDO from the datastore, and a toXML( ) method for transforming a DDO or an XDO to an Extensible Markup Language (XML) document, wherein the toXML( ) method:

builds a document object model (DOM) tree from the retrieved DDO or XDO, and produces the XML document from the DOM tree.

* * * * *